May 2, 1961

R. M. HEINTZ 2,982,271

HOT GAS PRODUCER OF THE FREE-PISTON TYPE AND METHOD FOR
STARTING AND OPERATING THE SAME

Filed April 23, 1956

INVENTOR.
Ralph M. Heintz
BY Lippincott & Smith
Attorneys

INVENTOR.
Ralph M. Heintz
BY Lippincott & Smith
Attorneys

INVENTOR.
Ralph M. Heintz

Attorneys

May 2, 1961 R. M. HEINTZ 2,982,271
HOT GAS PRODUCER OF THE FREE-PISTON TYPE AND METHOD FOR
STARTING AND OPERATING THE SAME
Filed April 23, 1956 8 Sheets-Sheet 8
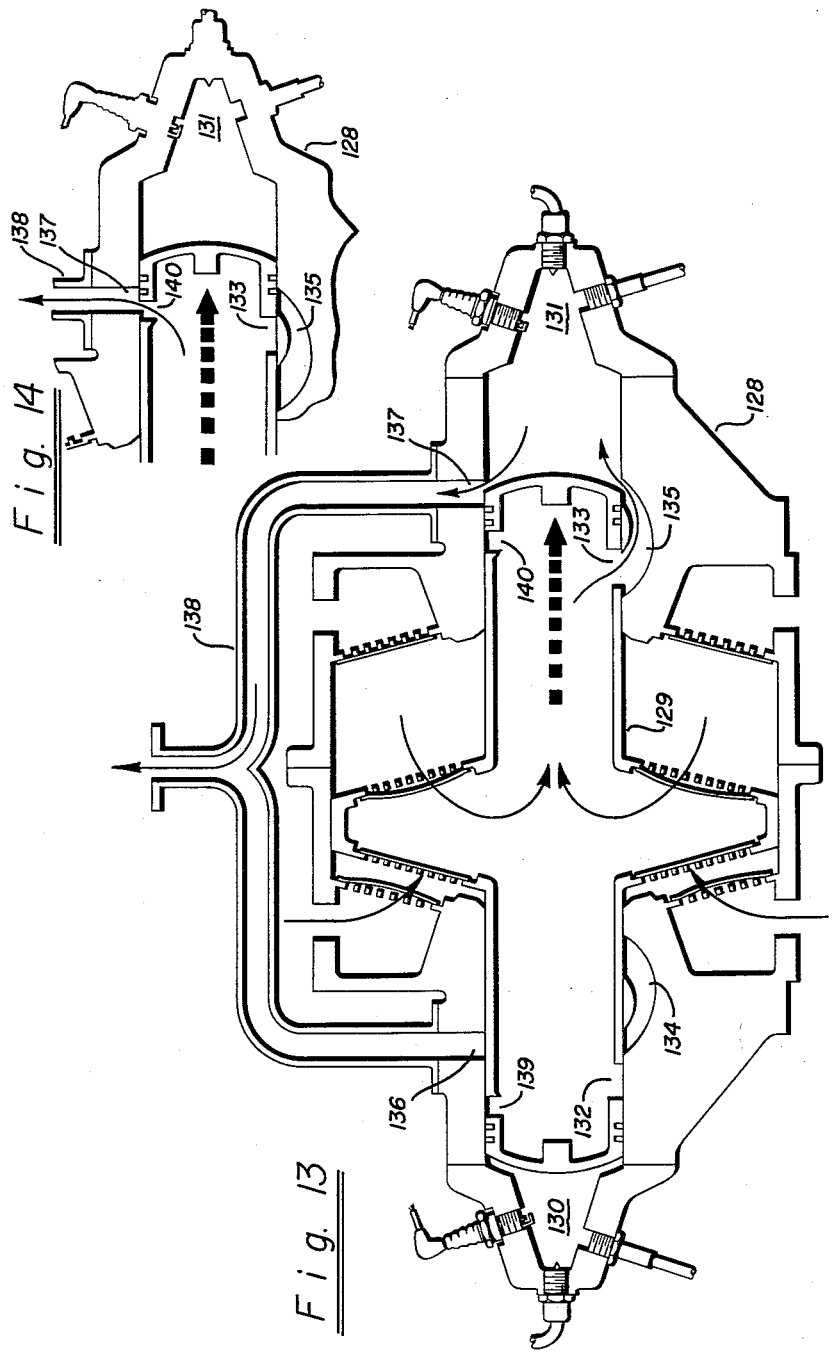
INVENTOR.
Ralph M. Heintz
BY Lippincott + Smith
Attorneys United States Patent Office 2,982,271
Patented May 2, 1961

2,982,271
HOT GAS PRODUCER OF THE FREE-PISTON TYPE AND METHOD FOR STARTING AND OPERATING THE SAME

Ralph M. Heintz, P.O. Box 546, Los Gatos, Calif.

Filed Apr. 23, 1956, Ser. No. 580,065

3 Claims. (Cl. 123—46)

This invention relates to free-piston internal combustion engines for supplying hot compressed gas to drive turbines and the like.

It has been realized previously that a free-piston internal combustion engine can be used advantageously to supply hot compressed gas for driving a turbine or the like, thereby providing a prime mover having theoretical and practical advantages over prime movers of other types. Free-piston engines adapted for such use may be called "hot gas producers" to distinguish them from engines adapted to supply useful power through mechanical connections ot the pistons. In such a hot gas producer, the combustion of fuel drives a reciprocating piston structure that includes the piston of an air compressor, and substantially all of the useful energy derived from combustion of the fuel is used to compress air or other gas, which is heated by the compression process. The hot compressed air, together with hot compressed exhaust gas produced by combustion of the fuel, may be used to drive a turbine or for other purposes.

The reciprocating piston structure is "free" in the sense that it is not connected to a crankshaft or the like, so that the amplitude of the reciprocating motion is generally somewhat variable. Although mechanical connections to the free-piston structure may be provided for driving certain auxiliaries necessary for operation of the free-piston engine, these connections do not transmit the useful output power of the engine nor do they materially restrain the free reciprocation of the piston structure.

Despite the significant advantages of the free-piston-and-turbine compound engine, such engines have not been extensively adopted as prime movers, chiefly because of deficiencies in hot gas producers heretofore available. Accordingly, a general object of this invention is to provide an improved hot gas producer of the free-piston type.

A serious disadvantage of previous internal combustion engines, whether of the free-piston type or not and including gasoline and diesel engines commonly used as prime movers for automobiles, buses and trucks, is that the exhaust fumes from such engines are generally noxious, often deadly when inhaled even in moderately concentrated mixtures with air, and irritating in more dilute mixtures. Such fumes may contribute substantially to the occurrence of unpleasant and harmful smog conditions which are becoming increasingly frequent and severe in many metropolitan areas. Accordingly, another general object of this invention is to provide an improved prime mover, suitable for use in motor vehicles and elsewhere, that produces substantially harmless and non-irritating exhaust gases which may be inhaled safely in any reasonable concentration that is likely to be encountered in the atmosphere.

The noxious character of the exhaust fumes produced by most internal combustion engines is largely a result of incomplete combustion of the fuel. Incomplete combustion of the fuel may produce carbon monoxide, various aldehydes, ketones, alcohols, ethers and other toxic substances. Another consequence of incomplete combustion is wasted energy and reduced efficiency of the engine. Accordingly, a specific object of this invention is to provide an improved internal combustion engine, in particular a hot gas producer of the free-piston type, that completely burns the fuel (either wholly within the combustion chambers of the free-piston engine or partly within such combustion chambers and partly in the manifold between the free-piston engine and the turbine, but in any event before expansion of the gases in the turbine) and derives substantially the maximum amount of useful work therefrom.

To be competitive with other prime movers for use in motor vehicles and the like, the hot gas producer-and-turbine combination should be small, light, reliable, and economical in initial cost and operating expense. With respect to these requirements, the free-piston-and-turbine compound engine has several inherent advantages. Its efficiency can be high, comparable to that of good diesel engines, with a correspondingly low fuel-consumption rate. Low-cost fuels may be used. The turbine gas temperatures are relatively low, as compared to those in a conventional gas-turbine engine, and consequently an inexpensive yet efficient turbine can be used. The size, weight and reliability of the turbine are favorable. Furthermore, a variable-ratio transmission generally is not required with the turbine, a fact that provides a substantial advantage in size, weight, cost, efficiency and reliability relative to crankshaft-type engines, especially if the variable-ratio transmission generally necessary with a crankshaft-type engine is of an automatic type or is a torque converter.

However, hot gas producers heretofore available have not been entirely satisfactory with respect to the objectives under consideration. Accordingly, a specific object of this invention is to provide a smaller, lighter, more reliable and less expensive hot gas producer of the free-piston type, as well as one that can operate at very high speeds.

Another specific object is to provide an efficient hot gas producer of the utmost simplicity, having a long life expectancy and requiring little maintenance, so constructed that any repairs or maintenance required may be performed quickly and economically.

The efficiency of an internal combustion engine is a direct function of its compression ratio. In other words, if the compression ratio can be increased, the efficiency is generally increased. In spark-ignition engines, the engine design as well as the octane rating of the fuel determines the maximum compression ratio that can be used satisfactorily. Accordingly, another specific object of this invention is to provide an improved spark-ignition engine, and in particular a hot gas producer of the free-piston type, that permits higher compression ratios with a given fuel than has been practicable heretofore.

Still another specific object of the invention is to provide an improved scavenging system for removing combustion products from combustion chambers of the engine.

Prime movers used in motor vehicles, and in many other applications, must be capable of supplying power in amounts variable over a considerable range, operating at reasonably good efficiencies throughout a major portion of such range, and responding promptly to operation of controls for adjusting or changing the amount of power supplied. Accordingly, still another object of this invention is to provide an improved apparatus and method for operating a hot gas producer of the free-piston type to provide controlled variations of the output power.

Another object is to provide improved means for automatically proportioning the amount of fuel supplied to the combustion chambers as a function of varying fuel requirements.

Another requirement for a practical prime mover is a simple and dependable starting system. Accordingly, another object of this invention is to provide an improved apparatus and method for starting a hot gas producer of the free-piston type.

Heretofore, free-piston engines have been prone to stall from the occurrence of a single misfire during operation. In addition to the delay and inconvenience arising from the necessity for restarting the engine, such stalling could have serious consequences, particularly in the operation of motor vehicles, since the engine may stall at a crucial moment when motive power is needed for safety. Accordingly, another specific object of this invention is to provide an improved hot gas producer that will seldom stall as a result of non-consecutive misfires.

Still other objects and advantages of the invention will appear as the description proceeds.

Briefly stated, in accordance with certain aspects of this invention, a vortex of hot compressed air is produced within a combustion chamber of a hot gas producer, and fuel is injected axially into the center of this vortex during the major portion of a compression stroke. The fuel vaporizes and remains substantially within the core of the vortex, which is the coolest part of the combustion chamber before combustion begins, so that the explosive mixture of air and fuel can be compressed to a greater extent without preignition than is practicable in conventional spark-ignition internal combustion engines.

Toward the end of the compression stroke, an electric spark is provided to ignite the explosive mixture in the core of the vortex, and combustion then occurs in a stratified manner, hereinafter more fully explained, that provides smoother burning and more complete combustion of the fuel than is usually achieved in internal combustion engines. In consequence of the improved combustion process thus achieved, the exhaust gases of the engine contain remarkably small amounts of noxious partial-combustion products. Any unburned fuel passing out of the engine is completely consumed by the large excess of air in the turbine inlet manifold, the exhaust of the turbine thus being free of toxic fumes.

According to other aspects of the invention, an improved hot gas producer has a unitary hollow free-piston structure which is the only part, aside from small parts of auxiliaries for fuel injection and ignition, that must move through a considerable distance during operation of the engine. The free-piston structure consists essentially of a one-piece light-weight casting which forms three axially alined hollow pistons rigidly connected together by a plurality of longitudinal internal ribs. The small mass of the single major moving part permits operation of the improved free-piston engine at unusually high cyclic rates, which in turn makes possible a very high power output relative to the size and weight of the engine.

The hollow piston structure serves as an air receiver for a double-acting air compressor, of which the middle piston is a part, and the longitudinal ribs, in addition to their structural functions, cool the two outer pistons which are parts of two opposed combustion chambers. Outlet check valves for the air compressor are mounted on two truncated conical valve plates attached to the free-piston structure at opposite ends of the middle piston.

A cylinder structure forms three axially alined cylinders, of which the middle cylinder is part of the air compressor while the two outer cylinders are parts of the two combustion chambers. The two outer cylinders have inner ends that open directly into opposite ends in the middle cylinder, and have outer ends that are rigidly closed by cylinder heads. Non-reciprocating lubricated rings at the inner ends of the two outer cylinders support the free-piston structure. Inlet check valves for the air compressor are mounted upon two truncated conical valve plates that are fastened to the cylinder structure at opposite ends of the middle cylinder.

The cylinder structure consists essentially of two axially alined parts rigidly fastened together, by bolts or the like, so that assembly and disassembly of the engine parts, during manufacture or subsequently for maintenance, can be effected quickly and at small expense. All parts of the engine are readily accessible for any maintenance that may be required, although simplicity of construction and the small number of moving parts reduce wear and maintenance requirements far below those of previous internal combustion engines.

The compressor check valves consist of thin elongated flat metal leaves radially oriented around perforated annular valve plates and urged into contact therewith by light leaf springs. The valve area is exceptionally large, and the valves are capable of operating with unusual speed because of their small mass and the exceedingly small distance, generally only a few mils, that the valve leaves must move relative to the valve plates. These valve characteristics are vital to efficient operation of the air compressor at the high cyclic rates possible with this engine.

Compressed air enters and exhaust gases leave the combustion chambers through circumferentially disposed ports that are covered and uncovered alternately by a piston as the free-piston structure reciprocates. These ports are arranged, in a manner hereinafter described, to provide through the combustion chambers intertwined air streams for improved scavenging of the combustion products and for creating violently revolving vortices within the combustion chambers to achieve the improved combustion process discussed elsewhere in this specification. The air paths through the entire engine are exceptionally short, direct and of low resistance, thereby facilitating efficient operation of the hot gas producer at high piston speeds and large air-flow rates.

In accordance with still other aspects of this invention, the output power of a hot gas producer is controlled by varying the amplitude and cyclic rate of the reciprocating motion of the free-piston structure. The engine has opposed combustion chambers at opposite ends of the free-piston structure, and the piston structure is driven back and forth by combustion of fuel in the two combustion chambers alternately. The fuel is ignited by electric sparks produced in the two combustion chambers alternately in timed relation to the reciprocating motion, and the amplitude of the reciprocating motion is controlled by the timing of the sparks.

Preferably, the power output is controlled by advancing and retarding the timing of the sparks, thereby changing the amplitude of the reciprocating motion and, for reasons hereinafter discussed, also changing the cyclic rate of operation. Since the power output is a function of both the amplitude and the cyclic rate of the reciprocating motion, small changes in the amplitude can provide much larger changes in the power output.

In a hot gas producer, substantially all of the useful energy derived from the partial expansion of gases in the combustion chambers following combustion of the fuel, less engine losses which are generally small, is used to compress air in the air compressor. The amount of air compressed per stroke of the free-piston structure is a direct function of the amplitude or stroke length of its reciprocating motion. That is, when the amplitude or stroke length increases, the amount of air compressed (as well as its pressure) per stroke also increases. Since the flow rate of gas through the turbine is a direct function of the turbine inlet pressure, and the supercharge of the power cylinders of the free-piston engine is a function of the exhaust manifold pressure of the free-piston engine, the gas pressure delivered to the turbine controls the amount of air pumped as well as the amount of supercharge applied to the power cylinders. The amount of supercharge ranges from substantially zero under idling conditions to 4 or more atmospheres at maximum power output.

In accordance with principles of the present invention, the amount of fuel injected into a combustion chamber during each compression stroke of the piston is proportioned as a direct function of the length of that stroke. In other words, when the amplitude of the reciprocating motion increases, an increased amount of fuel per stroke is supplied. This is accomplished by means of fuel pumps driven by reciprocation of the free-piston structure so that fuel injection takes place during a major portion of each compression stroke and ends upon the reversal direction of the free-piston structure that terminates the compression stroke. Consequently, the supply of fuel is automatically regulated in correspondence with the energy requirements of the air compressor.

In normal operation, the free-piston structure is driven back and forth by explosions in alternate ones of the two combustion chambers at opposite ends of the piston structure. However, the construction is such that, in the event of a misfire in one combustion chamber, the compressed gas in that chamber causes the piston structure to "bounce" sufficiently for subsequent combustion in the other chamber. Consequently, the engine generally does not stall because of non-consecutive misfires.

In accordance with still other aspects of this invention, a free-piston engine is started by supplying compressed gas to one of two opposed combustion chambers for moving the free-piston structure substantially to a mean position relative to its reciprocating motion during operation. The compressed gas is then admitted into both combustion chambers, and fuel is supplied to provide a compressed explosive mixture of fuel and air within both combustion chambers. Then an electric spark is produced in one of the combustion chambers to ignite the explosive mixture therein and initiate reciprocating motion of the free-piston structure.

The invention will be better understood from the following detailed description taken in connection with the accompanying drawings, and its scope is pointed out in the appended claims. In the drawings, which illustrate preferred embodiments of free-piston hot gas producers in which principles of this invention are incorporated;

Figure 1:
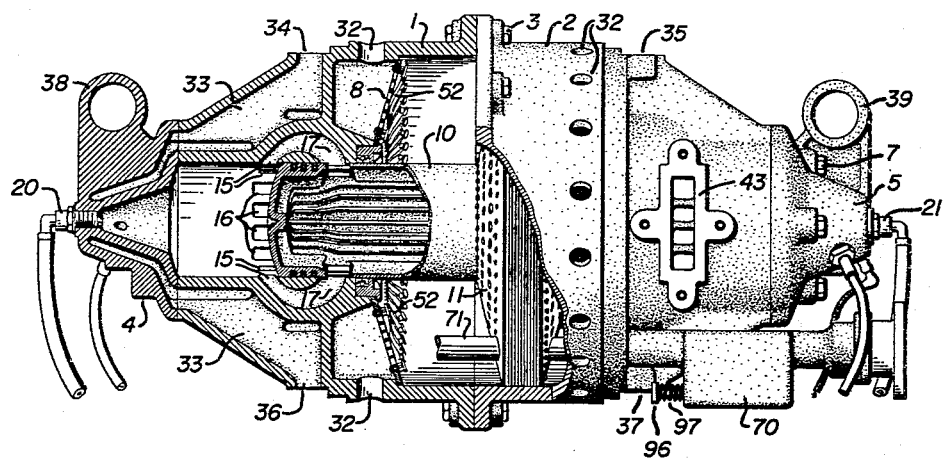
Fig. 1 is a side elevation of a free-piston engine, partly broken away with the left end thereof shown in a section taken generally along the line 1—1 of Fig. 3.
Figure 2:
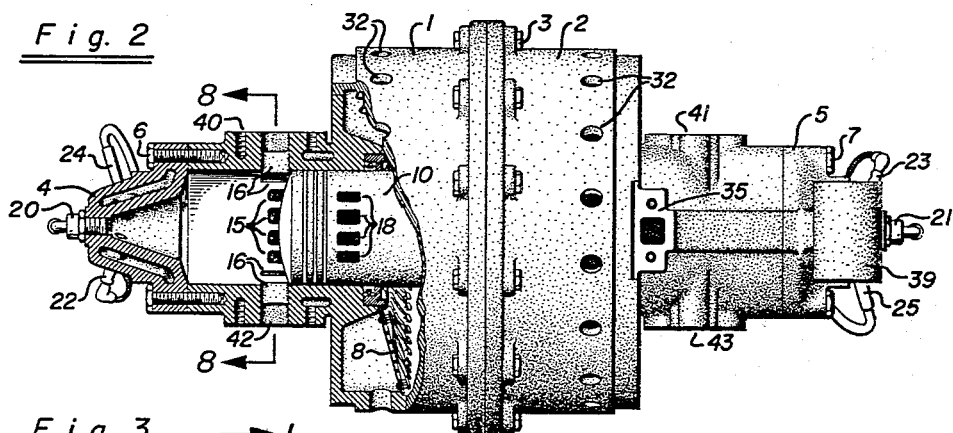
Fig. 2 is a top view of the same engine, partly broken away with the left end thereof shown in a section taken generally along the line 2—2 of Fig. 3.
Figure 3:
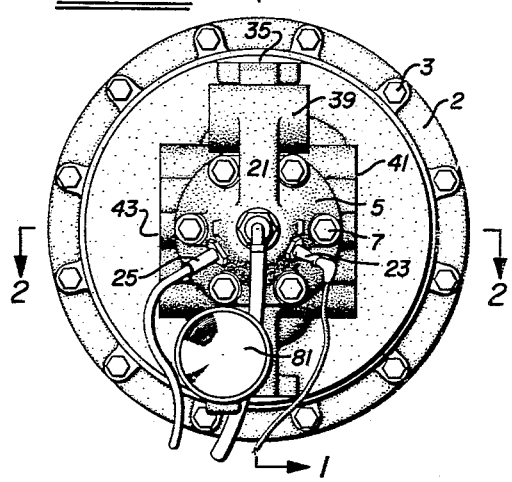
Figure 4:
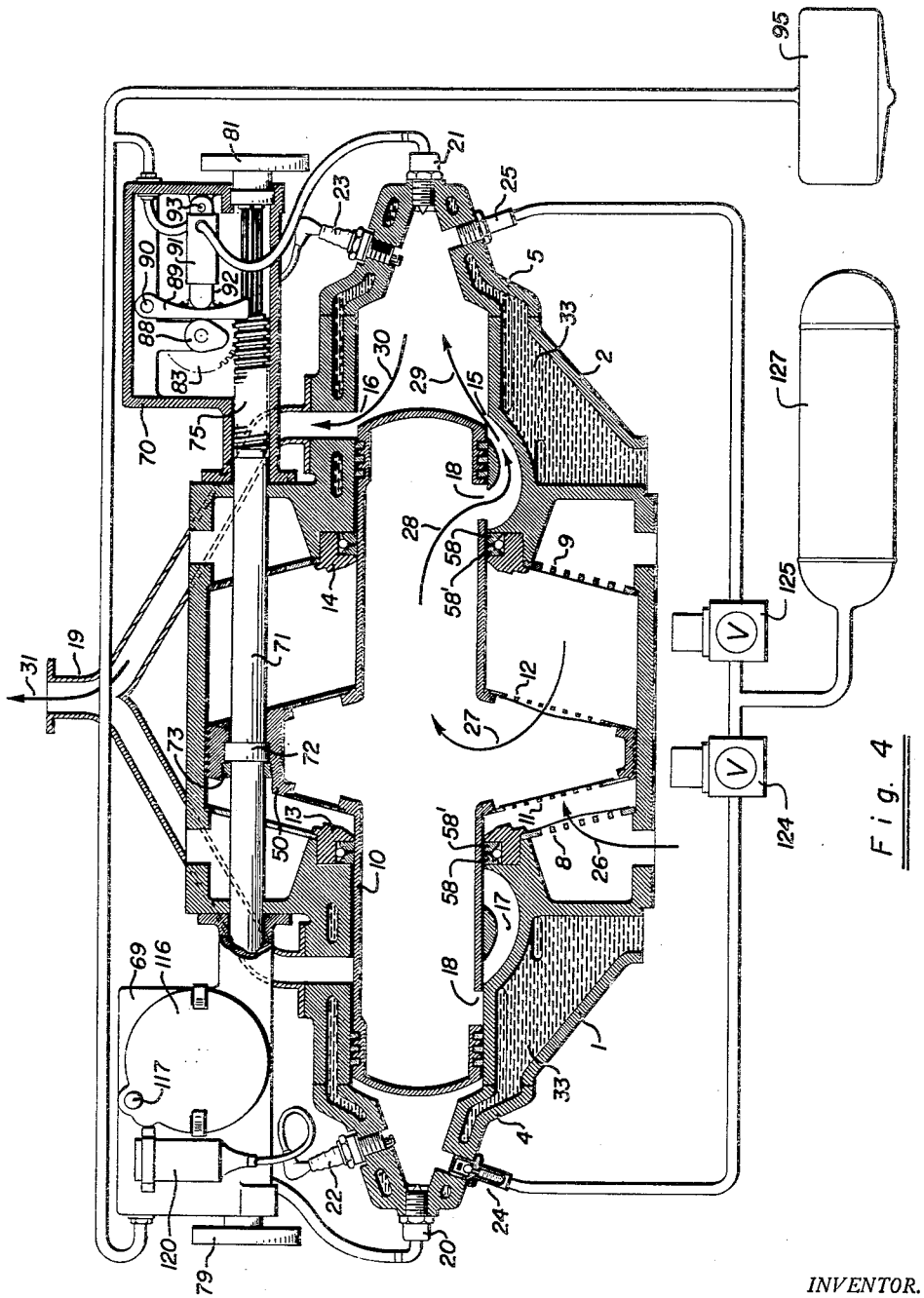
Figure 5:
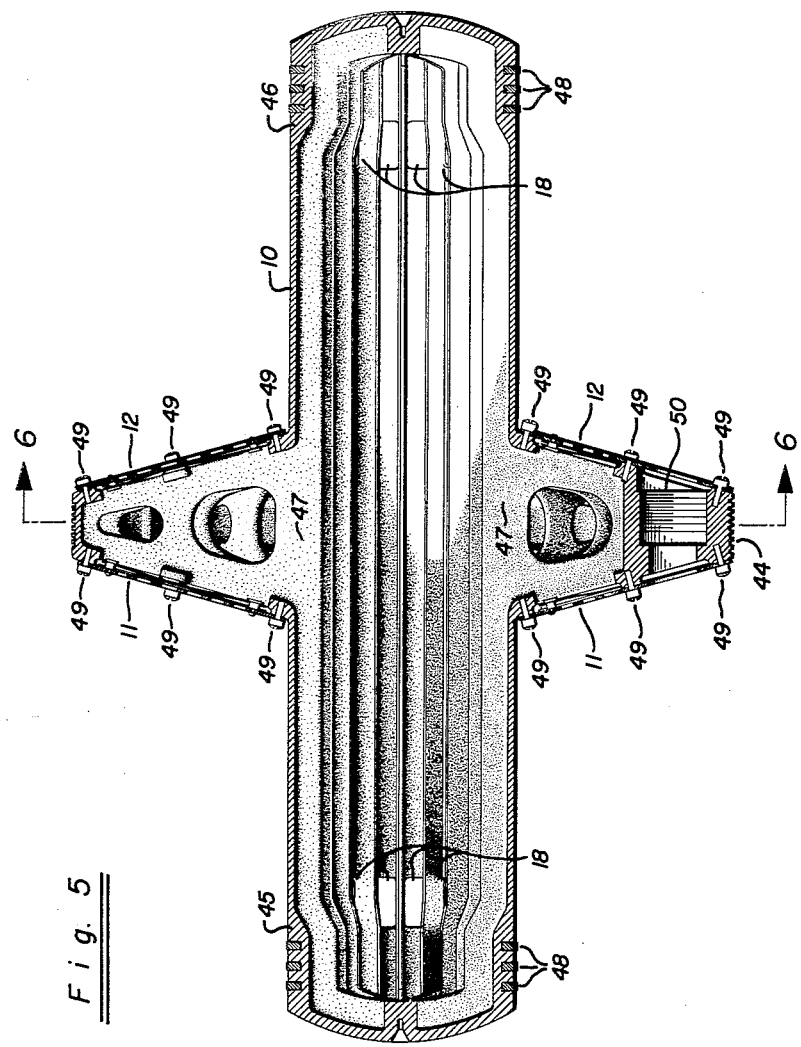
Figure 6:
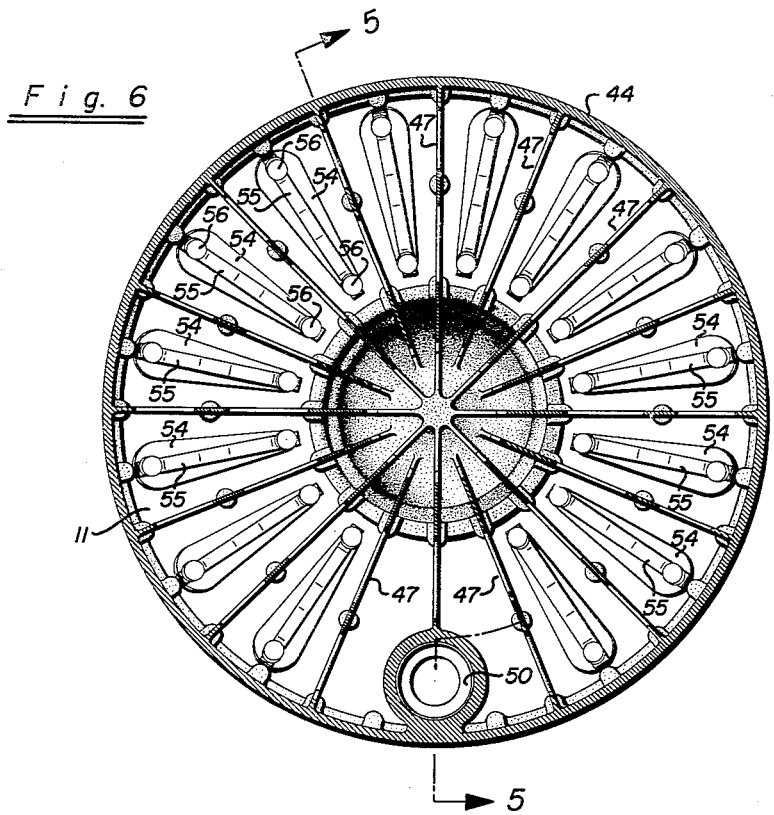
Figure 12:
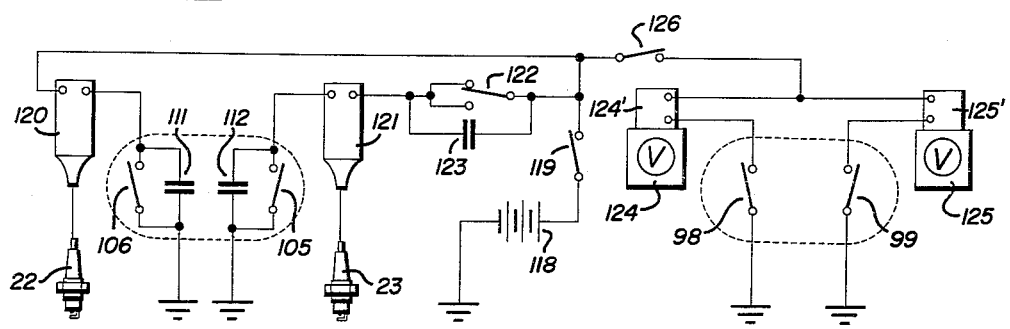
Figure 7:
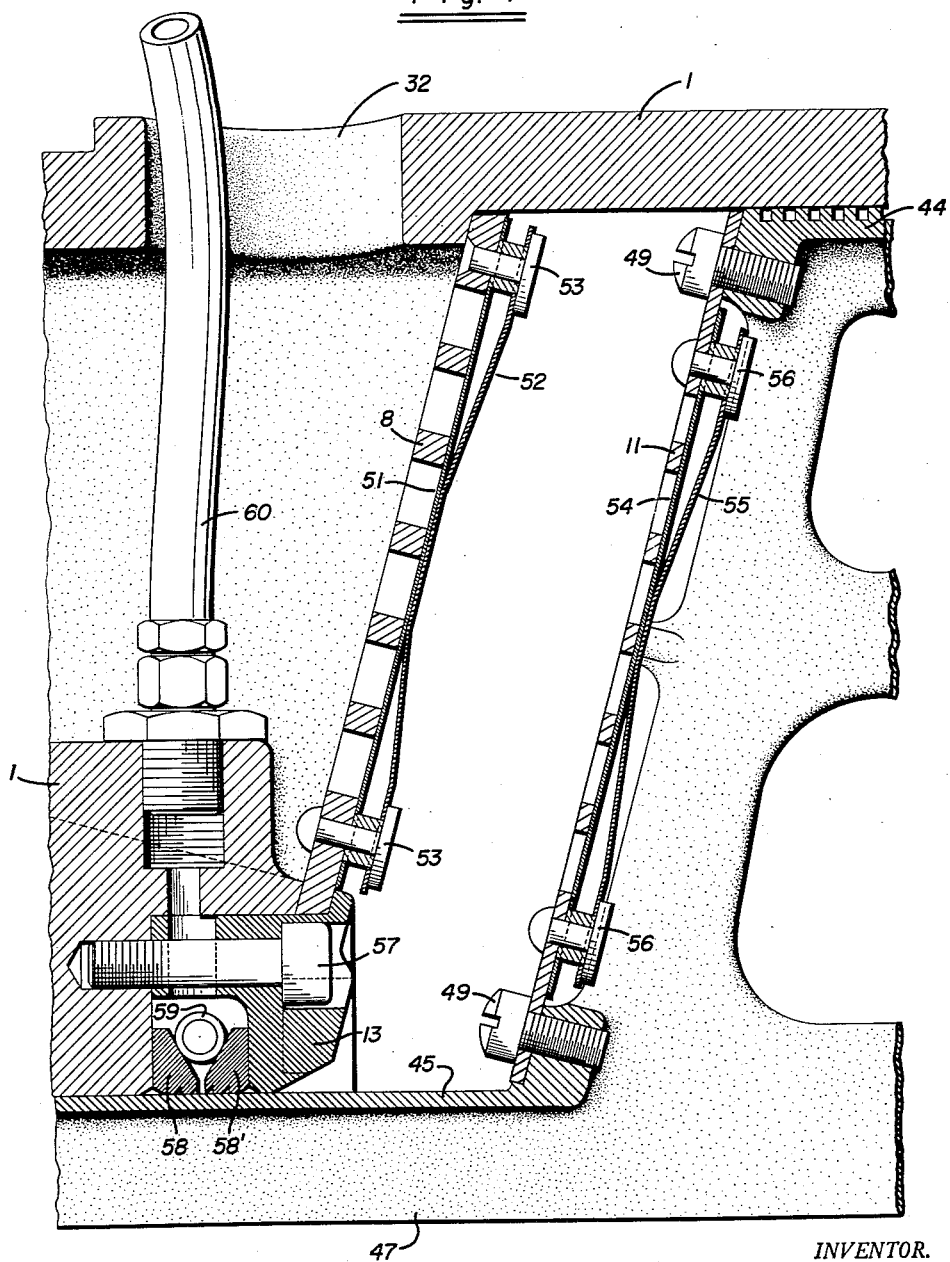
Figure 8:
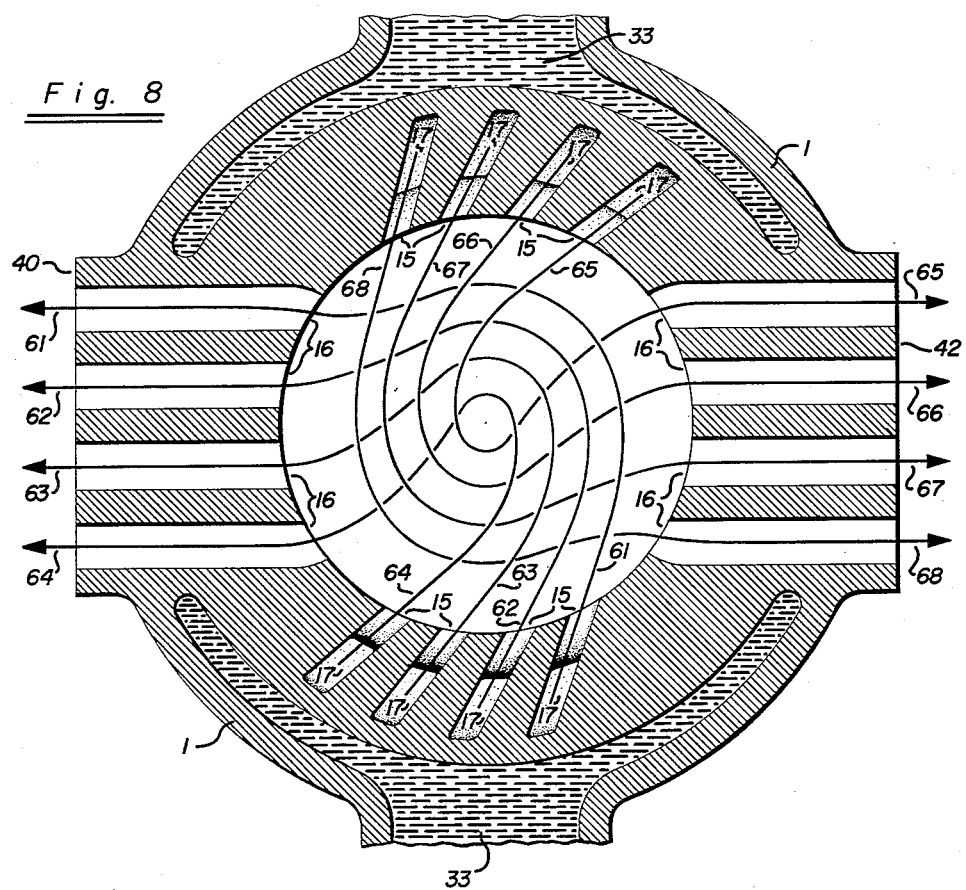
Figure 11:
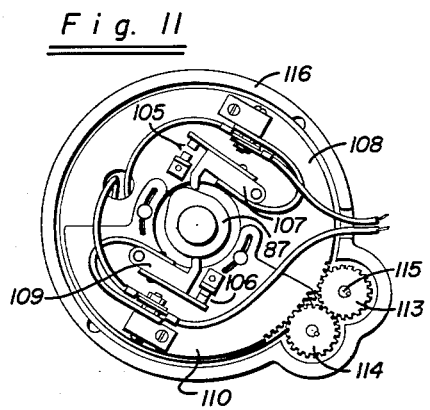
Figure 10:
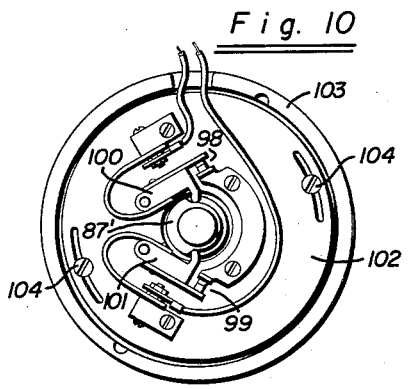
Figure 9:
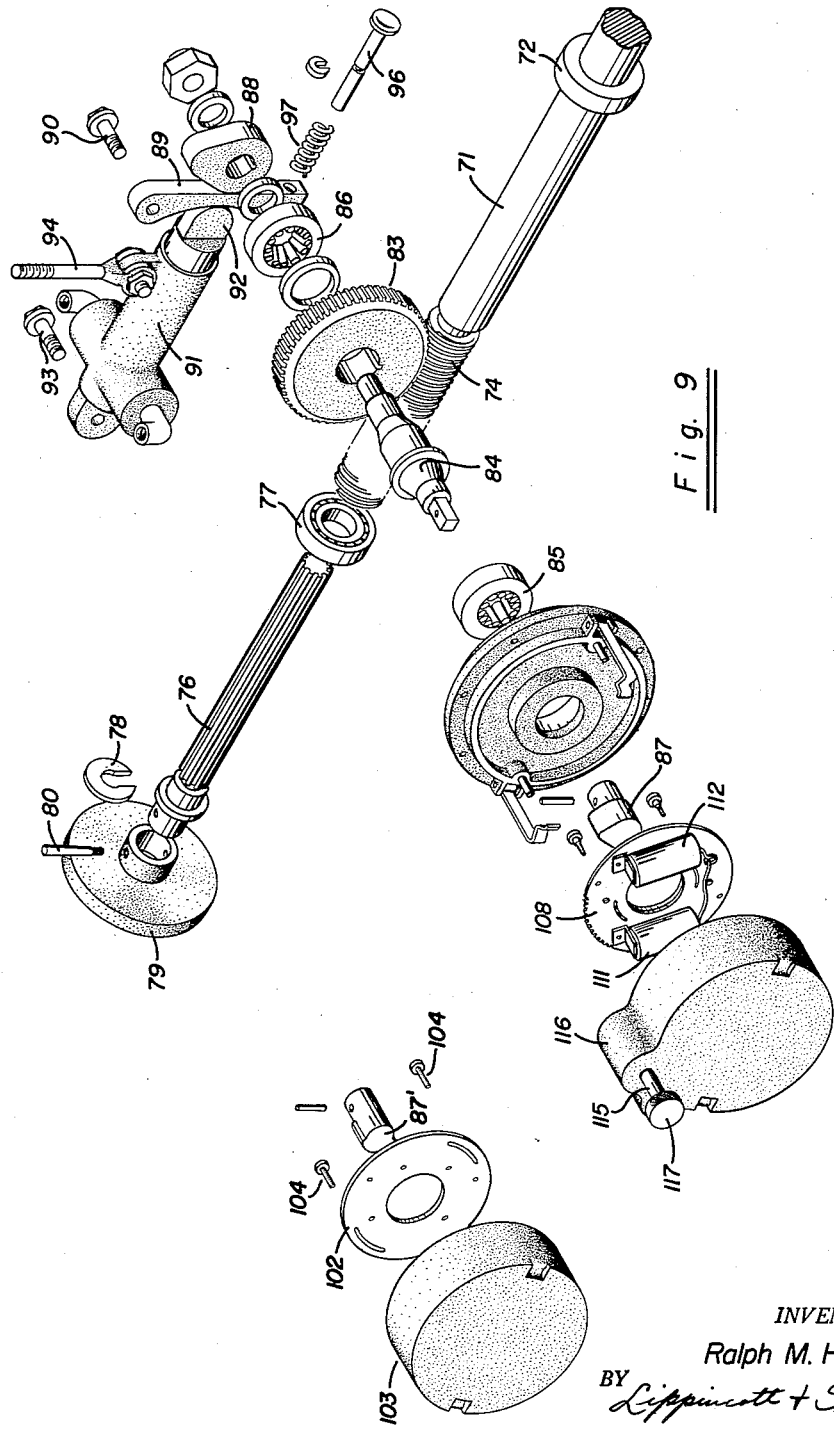

Fig. 3 is a right end view of the same engine, the planes of sections broken away in Figs. 1 and 2 being indicated generally by lines 1—1 and 2—2 in Fig. 3;

Fig. 4 is a schematic view of the same engine and its starting apparatus, the engine being generally shown in a simplified longitudinal section not taken along any specific true plane;

Fig. 5 is a longitudinal section of the free-piston structure of the same engine, the plane of Fig. 5 being indicated generally by the line 5—5 of Fig. 6;

Fig. 6 is a transverse section of the same free-piston structure, taken along the line 6—6 of Fig. 5;

Fig. 7 is an enlarged sectional detail of the same engine showing portions of the compressor check valves and portions of the lubrication system;

Fig. 8 is a section taken along the line 8—8 of Fig. 2, showing the inlet and exhaust ports of a combustion chamber and illustrating the paths of intertwined air streams which scavenge combustion products from the combustion chamber;

Fig. 9 is an exploded view showing certain parts in the same engine of auxiliaries for fuel injection, ignition timing and starting;

Fig. 10 is a schematic view of electric switches which are parts of the starting system of the same engine;

Fig. 11 is a schematic view of electric circuit breakers which are parts of the ignition system of the same engine;

Fig. 12 is a diagram of the electrical circuits of the same engine;

Fig. 13 is a schematic view showing an alternative embodiment of the invention; and Fig. 14 is a fragmentary schematic view of the same alternative embodiment, showing the piston structure in a different position.

Referring now to the drawings, and in particular to Figs. 1 through 4, a unitary cylinder structure forming three axially alined cylinders consists essentially of two metal castings 1 and 2 axially alined and rigidly fastened together by suitable means such as bolts 3. (Although made in several parts for convenience in manufacture and maintenance, from an operational viewpoint the cylinder structure is essentially a single part and is therefore unitary.) The middle or compressor cylinder, which is of larger diameter than the two outer cylinders, is part of a double-acting air compressor, and the two outer or motor or power cylinders are parts of two opposed combustion chambers. In the cylinder structure per se, the inner ends of the motor cylinders open directly into respective ends of the compressor cylinder (but in the complete engine these openings are closed by the piston structure and the connections between cylinders for air-flow purposes comprise the hollow piston structure and transfer passages 17 hereinafter described), and the outer ends of the two motor cylinders are rigidly closed by two cylinder heads 4 and 5 fastened to castings 1 and 2 by suitable means such as bolts 6 and 7. If desired, the cylinder heads may be cast integral with the cylinders. Inlet check valves for the air compressor are mounted on two perforated annular valve plates 8 and 9 attached to the cylinder structure at opposite ends of the middle cylinder.

A unitary reciprocable free-piston structure consists essentially of a one-piece hollow casting 10 that forms three axially alined interconnected and intercommunicating hollow pistons. The middle or compressor piston, which is open-ended and of larger diameter than the two outer pistons, fits within the middle cylinder to form a double-acting air compressor, while the two outer or motor pistons fit within the two outer cylinders to form two opposed combustion chambers. Outlet check valves for the air compressor are mounted on two perforated annular valve plates 11 and 12 that are attached to the free-piston structure at opposite ends of the middle piston.

The hollow free-piston structure forms a unitary air receiver for the air compressor. The free-piston structure is reciprocable relative to the cylinder structure, and may be supported therein by rings 13 and 14 fastened in non-reciprocating relation to the inner ends of the two motor cylinders, or by contact between the motor pistons and piston rings and the motor cylinders, or by both means. The outer ends of the motor pistons are closed, and preferably have the shape of spherical segments.

There are a plurality of inlet ports 15 and a plurality of exhaust ports 16 disposed circumferentially around the side wall of each combustion chamber so that all of these ports for each combustion chamber are covered and uncovered alternately by the motor piston of that chamber as the free-piston structure reciprocates. The ports are covered by the piston during a major portion of its reciprocating motion, and are uncovered during a terminal portion of each expansion stroke. The inlet ports 15 are at the outer ends of substantially arcuate air passages 17 having inner ends that are alined with ports 18 of the piston structure when the inlet ports of the combustion chamber are uncovered. Exhaust ports 16 communicate with an exhaust manifold 19 through which the free piston engine supplies hot compressed gas to a turbine (not shown) or other utilization apparatus.

Fuel injection nozzles 20 and 21 are axially centered in respective ones of the cylinder heads 4 and 5. The nozzles are designed to inject a fine spray of fuel along the central axis of the combustion chamber. The cylinder heads are also provided with spark plugs 22 and 23 which are parts of an ignition system, and with check valves 24 and 25 which are parts of a starting system hereinafter described.

During operation of the hot gas producer, the double-acting air compressor maintains within the hollow free-piston structure a supply of air under pulsating continuous pressure. In other words, the air pressure inside the hollow piston structure pulsates as the compressor operates, but is continuously at or above a supercharge pressure substantially equal to the exhaust manifold pressure, which is generally greater than atmospheric pressure and may be four or more times as great as atmospheric pressure. Fig. 4 illustrates the positions of the parts when the free-piston structure is just beginning to move toward the right. As the compressor piston moves toward the right, air is drawn into the air compressor through the inlet check valves at the left end of the compressor cylinder, as is indicated in the drawing by arrow 26. Air within the right end of the compressor is forced through the check valves at the right end of the compressor piston into the hollow free-piston structure, as is indicated by arrow 27. When the free-piston structure moves in the other direction, air is drawn into the right end of the compressor cylinder while air within the left end of the compressor is forced into the hollow piston structure. Consequently, a supply of air under pulsating continuous pressure is maintained within the hollow free-piston structure, which acts as a unitary air receiver for the compressor.

With respect to each combustion chamber, the reciprocating motion of its piston consists of expansion strokes alternating with compression strokes. Since the combustion chambers are at opposite ends of a unitary free-piston structure, an expansion stroke in one combustion chamber occurs simultaneously with a compression stroke in the other combustion chamber.

Toward the end of each expansion stroke of a piston in a combustion chamber, the inlet and exhaust ports of that combustion chamber are uncovered by its piston and compressed air flows from the hollow piston structure through passages 17 and inlet ports 15 into the combustion chamber, as is indicated in Fig. 4 by arrows 28 and 29. Air and combustion products flow out of the combustion chamber through exhaust ports 16 and exhaust manifold 19, as is indicated in Fig. 4 by arrows 30 and 31. The inlet and exhaust ports remain open, and the air flow may continue, until the ports are again covered by the piston during the following compression stroke. In this way, combustion products are scavenged and the combustion chamber is recharged with a fresh supply of compressed air substantially at the end of each expansion stroke of its piston. The minimum air pressure in the air receiver and the charging pressures in the combustion chambers are determined by the exhaust manifold pressure, which in turn depends upon the back pressure of the turbine or other utilization device operated by the exhaust gases and may be four or more times atmospheric pressure. Consequently each combustion chamber is supercharged at the beginning of each compression stroke therein with a fresh charge of air at a pressure generally greater than atmospheric pressure.

During each compression stroke of a piston in a combustion chamber, fuel is injected into that combustion chamber through one of the fuel injection nozzles 20 and 21. The compressed air and the injected fuel form an explosive mixture which is further compressed during the compression stroke.

Toward the end of a compression stroke in a combustion chamber, an electric spark is produced in that combustion chamber by an ignition system including spark plugs 22 and 23. The spark ignites the explosive mixture in the combustion chamber, and the resulting increase of pressure within that combustion chamber reverses the motion of the free-piston structure, thereby terminating the compression stroke with respect to that combustion chamber within which the explosion occurred and initiating a compression stroke in the other combustion chamber. As explosions take place in the two combustion chambers alternately, the free-piston structure is driven back and forth in substantially continuous reciprocating motion.

In normal use of the hot gas producer, exhaust manifold 19 is connected to a turbine (not shown) or other device for utilizing the hot gases supplied by the hot gas producer, and the back pressure in the exhaust manifold is substantially greater than atmospheric pressure. For example, the manifold pressure may be three or more atmospheres. The minimum air pressure maintained by the air compressor within the hollow free-piston structure is about the same, and is just sufficient to produce a substantial air flow through the combustion chambers into the exhaust manifold when the inlet and exhaust ports of a combustion chamber are uncovered by its piston. These pressure relations are maintained automatically, since an increase in the pressure within the hollow piston structure or air receiver relative to the pressure within the exhaust manifold increases the flow of air through the combustion chambers, thereby tending to increase the manifold pressure and to reduce the air receiver pressure, and vice versa.

The expansion of hot gases in the combustion chambers during the expansion strokes provides the energy needed to compress the air in the air compressor and to supply energy losses in the free-piston engine. Since such energy losses are small, consisting principally of heat lost to the cooling system, substantially all of the useful energy derived from burning the fuel is utilized in supplying hot compressed gas to drive the turbine. If combustion of the fuel provides more energy than is required for air compression and engine losses during any cycle, the excess energy accelerates the piston structure and increases the stroke and to some extent the cyclic rate of operation so that the flow rate and back pressure of the exhaust gases increase, thereby increasing the work done per cycle by the air compressor, until an energy balance is established. Thus the engine is essentially self-regulating.

Further details of the cylinder structure are best illustrated in Figs. 1 through 3. The cylinder structure is symmetrical about a transverse plane through its center, parts on one side of this plane being substantially mirror images of corresponding parts on the other side of the same plane. Each of the castings 1 and 2 has an open-ended hollow cylindrical portion that forms part of the compressor cylinder, and has a hollow cylindrical portion of smaller diameter that forms one of the motor cylinders. Between these two cylindrical portions there is an annular opening that is covered by the perforated valve plate which supports the compressor inlet check valves. Adjacent to the outer side of the valve plate there is an annular space which is divided into a plurality of air inlet chambers by a plurality of radial reinforcing ribs. These air inlet chambers are connected to the atmosphere, or to an intake manifold (not shown), by a plurality of air inlet holes 32 circumferentially disposed around side portions of the castings 1 and 2, as shown.

Water jackets 33 surround the combustion chambers, including the inlet and exhaust ports, providing a cooling system to prevent overheating of the motor cylinders and the cylinder heads. Inlet connections to the water jackets are shown at 34 and 35, while outlet connections thereto are shown at 36 and 37. Lugs 38 and 39, which are cast integral with the cylinder heads, may be connected to any suitable mounting means for supporting the engine. Connections for the exhaust manifold are shown at 40, 41, 42 and 43.

The unitary free-piston structure is best shown in Figs. 5 and 6. Referring to these figures, a one-piece casting 10, preferably of a lightweight metal such as aluminum, forms a compressor piston 44 between and in axial alinement and interconnected with two motor pistons 45 and 46 of smaller diameter. The three pistons are hollow and intercommunicating to form a unitary air receiver, and are rigidly connected together by a plurality of internal longitudinal ribs 47, which preferably extend throughout the entire length of the piston structure. Ribs 47 also assist in cooling the pistons.

The two motor pistons may be provided with conventional piston rings 48, although the piston rings are not essential and may be omitted in a high-speed engine. Preferably there are no rings on the compressor piston, but there are a plurality of annular grooves therein forming a labyrinth which impedes the flow of air between the side wall of the piston and the side wall of the compressor cylinder. There is sufficient clearance between the piston walls and the cylinder walls to permit free reciprocating motion of the free-piston structure with a minimum amount of friction and wear. In preferred embodiments, the free-piston structure is supported chiefly by the pair of rings 13 and 14 attached to the cylinder structure at the inner ends of the respective motor cylinders. Some additional support may be provided by piston rings 48, but this is merely incidental to the sealing functions of the piston rings.

The compressor piston 44 is both hollow and open-ended, so that annular openings exist at opposite ends of the compressor piston between the side of this piston and the sides of the smaller diameter motor pistons. These two annular openings are covered by perforated annular valve plates 11 and 12 which support the outlet check valves of the air compressor. The valve plates 11 and 12 are fastened to the free-piston structure by a plurality of screws 49. The entire free-piston structure is hollow, and constitutes a unitary air receiver for the air compressor.

The outer ends of the motor pistons are closed, and preferably are shaped like convex spherical segments. Ports 18 are provided in the side walls of the motor pistons to permit the flow of compressed air from the air receiver through passages 17 into the combustion chambers. Means are provided at 50 in the compressor piston for the attachment of a linkage to drive auxiliaries hereinafter described.

The engine herein described is of an unusually compact and economical construction. Aside from small parts of the auxiliaries, the only part of the engine that moves a substantial distance during operation is the unitary free-piston structure, which consists essentially of a light-weight one-piece casting.

The small mass of the reciprocating piston structure is especially significant, since the piston mass is a major factor determining the cyclic rate at which the engine operates. The burning of fuel in the two combustion chambers alternately produces forces that drive the piston structure back and forth in reciprocating motion. With applied forces of a given magnitude, the acceleration of the piston structure is inversely proportional to its mass. Therefore, other factors being equal, a reciprocating structure of small mass moves at higher speed, so that the engine operates at a higher cyclic rate, than would be the case if the piston structure were heavier.

The rate at which compressed gas is supplied by the engine, and hence the power output of the engine, is a direct function of the cyclic rate and stroke length. Consequently, the high cyclic rate of operation, which results from the lightness of the reciprocating structure, results in an exceptionally high power output relative to the size and weight of the engine as a whole.

The small mass of the reciprocating piston structure has other advantages. Assume that the piston structure is perfectly stationary while the free-piston structure reciprocates. Under these conditions, the only considerable unbalanced forces within the engine as a whole are the forces required for alternately accelerating and decelerating the free-piston structure during each half-cycle of its reciprocating motion.

Now assume that the cylinder structure is so mounted that it also is free to reciprocate. In this case the forces that accelerate the piston structure in one direction are balanced by equal forces that accelerate the cylinder structure in the opposite direction, so that the cylinder structure reciprocates in phase opposition to the reciprocation of the piston structure. However, in the engine herein described, the mass of the cylinder structure is many times greater than the mass of the piston structure. Consequently, the motion of the cylinder structure, even if completely unrestrained, has a relatively small amplitude and amounts to no more than a small vibration which can be absorbed by suitable mounting of the engine on simple vibration-absorbing supports.

The construction of the compressor check valves is best shown in the enlarged detail section, Fig. 7. Inlet check valves are mounted upon perforated annular valve plate 8, preferably having the shape of a truncated conical surface perforated throughout a major portion of its area, that covers an annular opening between one end of the compressor cylinder and the adjacent motor cylinder. The outer surface of valve plate 8 abuts on portions of the casting 1, including the radial ribs between the air inlet compartments immediately to the left of the compressor cylinder. Valve plate 8 is fixedly attached to the cylinder structure by ring 13, which has a flange that grips the inner circumference of the valve plate in the manner shown. A similar valve plate 9 is attached to the cylinder structure at the opposite end of the compressor cylinder structure, as is shown in Fig. 4.

The inlet check valves comprise a plurality of flat elongated metal leaves 51 that are urged into contact with the inner surface of plate 8 by a plurality of light leaf springs 52, thereby covering the perforations in plate 8 to close the inlet check valves. Valve leaves 51 and valve springs 52 preferably are made from thin sheets of stainless steel. The valve leaves and springs are radially oriented and are disposed around substantially the entire inner surface of plate 8, as is best shown in Fig. 1. The ends of springs 52 are attached to valve plate 8 by suitable means such as rivets 53, while center portions of springs 52 are bowed and in contact with leaves 51, as is best shown in Fig. 7.

Rivets 53 pass through holes in each end of leaves 51, so that the valve leaves are kept in radially oriented positions but are free to move away from plate 8, against the resilient force of springs 52, by a sufficient distance, generally only a few mils, to permit a unidirectional flow of air through the perforations in valve plate 8 into the compressor cylinder. Because of the large valve area thus provided, and because of the light weight of the valve leaves and their small motion relative to valve plate 8, the compressor check valves operate with great rapidity with very little pressure drop in air flowing through the valves.

The outlet check valves of the air compressor are of similar construction, and are mounted upon perforated annular valve plates 11 and 12 attached to the free-piston structure at opposite ends of the compressor piston. Each of the plates 11 and 12, which are similar in construction, preferably has the shape of a truncated conical surface perforated throughout a major portion of its area. Forces due to piston movement tend to open and close the valves at the proper time, and thus assist rapid valve operation. However, rapid and dependable valve operation is not solely dependent on such forces, but is also enhanced by the light weight and large area of the valves.

Flat elongated valve leaves 54, preferably made of thin sheets of stainless steel, are radially oriented and are disposed around substantially the entire inner surfaces of valve plates 11 and 12, as is best shown in Fig. 6. A plurality of light leaf springs 55 urge valve leaves 54 into contact with the inner surface of valve plate 11 to cover the perforations in the valve plate and close the outlet check valves. The ends of springs 55 are attached to valve plate 11 by suitable means such as rivets 56, while center portions of springs 55 are bowed into contact with valve leaves 54 to urge the valve leaves into contact with the valve plate.

Rivets 56 pass through holes in each end of leaves 54 thereby holding the valve leaves in radially oriented positions while permitting the valve leaves to move away from the valve plate, against the resilience of springs 55, by a sufficient distance, generally only a few mils, to permit a unidirectional flow of air from the compressor cylinder into the hollow piston structure.

The novel check valve structure is especially advantageous in high-speed operation of the engine. Because of the large valve area provided, there is little pressure loss in the air flowing through the check valves even at high flow rates encountered when the engine is operating at maximum power output. The light weight and the small amount of motion of the valve leaves permits operation of the check valves at exceptionally high speeds, and thus permits operation of the engine at the exceptionally high cyclic rates permitted by the lightness of the reciprocating piston structure. Furthermore, the valve structure is such that maintenance and repairs are seldom required, and such that the valves can easily be replaced whenever such is required.

Another feature of considerable importance in high-speed operation of the engine is that the free-piston structure is supported chiefly by the non-reciprocating lubricated rings 13 and 14 attached to the inner ends of the motor cylinders by suitable means such as bolts 57, as is best shown in Fig. 7. Annular spaces at the outer ends of rings 13 and 14 receive split rings 58 and 58' which are held in contact with the motor pistons by garter springs 59. The garter springs serve several functions. First, they hold rings 58 and 58' in good contact with the piston structure. Second, they spread rings 58 and 58' apart so that oil can pass between rings 58 and 58', but not around the outer sides of these rings.

Lubricating oil is supplied to these annular spaces through tubes 60, and this lubricant passes between split rings 58 and 58' to the walls of the motor pistons, thereby providing and distributing a film of oil which lubricates the sliding contact between the motor pistons and the supporting rings 13 and 14. A sufficient amount of lubricating oil from the same source reaches piston rings 48 to lubricate these rings. Preferably, there is no other physical contact between the piston structure and the cylinder structure. Other tubes may be connected to the opposite sides of the annular spaces in rings 13 and 14 so that the lubricant can be circulated continuously by suitable means such as a conventional oil pump (not shown). No lubrication of the compressor piston is required, since the clearance between the compressor piston and the wall of the compressor cylinder is sufficient to prevent any actual contact between these parts.

Because the engine described is of exceedingly simple construction and has a few moving parts, little wear occurs during operation and the life expectancy of the engine is exceptionally long. Maintenance and repairs are seldom necessary; but whenever maintenance is required the engine is easy to disassemble and to reassemble without the application of extensive labor or specialized skill. All parts are readily accessible for any maintenance that may be required.

The paths of air flow through the combustion chambers can best be understood by reference to Figs. 1, 2, 4 and 8. In Fig. 8 the principal air flow paths are indicated by arrows 61, 62, 63, 64, 65, 66, 67 and 68. Arrows 61, 62, 63 and 64 represent a first air stream flowing from one set of inlet ports to one set of exhaust ports. Arrows 65, 66, 67 and 68 represent a second air stream flowing from a second set of inlet ports to a second set of exhaust ports. The two air streams are intertwined. Terminal portions of the air inlet passages 17 are oblique with respect to the axial, radial and tangential directions of the motor cylinder, as is best shown in Figs. 4 and 8. Consequently, air supplied to the combustion chamber through inlet ports 15 is directed in initial directions having tangential, radial and axial components with respect to the combustion chamber.

Preferably, each combustion chamber has four sets of ports, consisting of two sets of four inlet ports respectively disposed in two diametrically opposite quadrants of the cylinder wall, and two sets of four exhaust ports respectively disposed in the other two quadrants of the cylinder wall, as is best shown in Fig. 8. These sixteen ports are circumferentially arranged around a portion of the cylinder wall, with the exhaust ports extending a greater distance lengthwise of the cylinder so that the exhaust ports are uncovered first during an expansion stroke and are covered last during a compression stroke.

In normal operation of the engine, a turbine or other utilization device connected to exhaust manifold 19 creates a back pressure in the exhaust manifold which may be in the order of 3 or 4 atmospheres, or more. The air compressor of the free-piston engine maintains a supply of compressed air within the hollow free-piston structure of air receiver at a pressure such that compressed air flows through each combustion chamber whenever the inlet and exhaust ports of that combustion chamber are uncovered by its piston.

All of the inlet ports 15 and exhaust ports 16 of a combustion chamber are covered by the motor piston of that combustion chamber during a major portion of each cycle of reciprocating motion of the free-piston structure. Toward the end of each expansion stroke of the motor piston, the exhaust ports 16 are uncovered first, and the hot gases within the combustion chamber, then under pressure considerably greater than the pressure in the exhaust manifold, begin to flow rapidly out through the exhaust ports into the exhaust manifold 19.

Shortly thereafter during the expansion stroke, the inlet ports 15 are uncovered and compressed air flows from the hollow free-piston structure, which is the compressor air receiver, through passages 17 and inlet ports 15 into the combustion chamber. This flow of compressed air scavenges the remaining combustion products from the combustion chamber and recharges the combustion chamber with a fresh supply of compressed air substantially at the air receiver pressure. The induction of air into the combustion chamber is aided by the momentum of the exhaust gases initially discharged therefrom at high velocity. Consequently, a substantial flow of compressed air through the combustion chamber occurs even though the pressure within the compressor air receiver may be only slightly in excess of, or even slightly lower than, the average back pressure in the exhaust manifold. Because of the large areas at the inlet and exhaust ports, which together completely encircle the combustion chamber, pressure losses in the gas flow through the ports is exceptionally small.

The amount of compressed air admitted to the combustion chamber always is in excess of the amount required to recharge the combustion chamber and the excess air flows out through the exhaust ports. The principal paths of air streams through the combustion chamber at this time are illustrated in Fig. 8 by the arrows 61 through 68.

Because the initial directions of the entering air have axial, radial and tangential components relative to combustion chamber, the air stream entering the combustion chamber through each set of inlet ports passes over the air stream leaving the combustion chamber through the set of exhaust ports to the right of that set of inlet ports, and then may pass under the air stream entering the combustion chamber through the diametrically opposite set of inlet ports and leave the combustion chamber through the set of exhaust ports to the left of that set of inlet ports through which the same stream entered the combustion chamber. As a result, a pair of intertwined air streams are provided, as illustrated by the arrows in Fig. 8. While the arrows 61—68 represent typical paths of principal air streams through the combustion chamber there may also be secondary streams which assist in the scavenging process, including streams or portions thereof that pass over the entering air streams.

These intertwined air streams are exceptionally effective in scavenging combustion products from the combustion chamber, not only because the principal air streams fill a substantial part of the combustion chamber but also because these streams are so directed that gas not in the path of the principal streams is entrained and expelled from the chamber by these streams. It should be noted that the incoming air is so directed that it does not interfere with the principal escape paths of the exhaust gases. In fact, the outward flow of exhaust gases, which started when the exhaust ports were first uncovered, aids in drawing air into the combustion chamber through the inlet ports.

The inlet and exhaust ports of the combustion chamber remain open during initial portions of the following compression stroke, but thereafter the ports are covered by the piston and the flow of air therethrough is substantially cut off. Consequently, when the piston of a combustion chamber just covers the exhaust ports of that chamber during the initial portion of a compression stroke, that combustion chamber contains compressed air at a pressure substantially equal to the back pressure in the exhaust manifold, which may be a pressure of about 3 or more atmospheres.

As the piston continues its compression stroke, the air within the combustion chamber is further compressed, to a pressure of 10 or 12 atmospheres, for example, so that the over-all compression ratio of the engine, and therefore its efficiency, is much higher than that in a conventional spark-ignition gasoline engine, and is comparable to that in a good diesel engine.

The compressed air remaining within the combustion chamber after the exhaust ports are covered still has considerable angular momentum, and as a result the air continues its circumferential motion during the remainder of the compression stroke and the following expansion stroke, thereby providing a persisting and rapidly rotating vortex of compressed air within and coaxial with the combustion chamber. As the compression stroke proceeds, most of the charge is compressed into a substantially conical cavity in the cylinder head having a smaller diameter than the motor cylinder. This constricts the diameter of the vortex and thus increases its angular velocity, so that at the end of the compression stroke a violently revolving vortex is present in the conical portion of the combustion chamber.

Fuel is injected axially into the center of this vortex during a portion of the compression stroke. Preferably the fuel injection begins just as or just before the exhaust ports are covered by the piston during an initial portion of the compression stroke, so that no fuel is lost through the exhaust ports, and ends when the piston reverses its direction of motion at the end of the compression stroke.

The fuel is injected by the injection nozzle in the form of a fine spray directed along the central axis of the vortex. Droplets of the injected fuel are swirled around by the vortex and are driven outward by centrifugal force, but the violent action of the air stream on the fuel droplets quickly tears the droplets apart and vaporizes the fuel, so that most of the fuel remains near the center of the vortex, and little if any of the fuel reaches outer portions of the vortex adjacent to the cylinder wall.

Before combustion starts, the center of the vortex is the coolest region of the combustion chamber, not only because it is the most remote from the hot cylinder wall and other hot metal parts, but also because of adiabatic expansion due to centrifugal force which cools gases at the vortex center, and also because of the vaporization of fuel in the core of the vortex which produces additional cooling. Thus the vaporized fuel is retained in the relatively cool central portion of the vortex out of contact with hot metal parts of the combustion chamber. Furthermore, the exhaust ports, which are generally the hottest portion of a combustion chamber, are covered by the piston during the fuel injection period.

Consequently, the explosive mixture of fuel and air can be compressed to a greater degree without preignition than is practicable in conventional spark-ignition internal combustion engines. For example, a fuel such as medium test gasoline having an octane rating that limits the maximum practical compression ratio in a conventional automobile engine to about 6 or 7, can be used satisfactorily in free-piston engines constructed in accordance with the principles of this invention at compression ratios of 10 or more. The higher compression ratios result in substantially higher efficiencies and lower rates of fuel consumption.

Because the most volatile constituents of the fuel vaporize first as the injected fuel droplets move outward from the center of the vortex under the influence of centrifugal force, and also because the vortex acts somewhat like a centrifugal separator, the lightest, most volatile and most explosive constituents of the vaporized fuel remain in the innermost region of the vortex where a rich mixture is formed that has a relatively high ratio of fuel to air. Around this innermost region there are annular strata containing progressively heavier constituents of the vaporized fuel mixed with progressively larger proportions of air. Near the walls of the combustion chamber there is very little fuel and a large excess of air, especially when the engine is operating at less than maximum power output. Generally, there is an excess of air in the combustion chamber except when operating at maximum output.

When the explosive mixture of fuel and air is ignited by an electric spark, a flame spreads rapidly through fuel-rich strata near the axis of the vortex, and rapid burning of the rich mixture containing the lighter constituents of the fuel produces a high-temperature combustion zone in the core of the vortex. The excess of fuel initially present in this high-temperature combustion zone assures complete utilization of the oxygen initially present therein.

After combustion starts, the pressure in the combustion chamber rises rapidly, and this increased pressure quickly reverses the direction of motion of the free-piston structure, thereby terminating the compression stroke and initiating an expansion stroke. A rapid change in direction of the piston motion is aided by the conical shape of the cylinder head, which "focuses" a pressure wave onto the piston face. During the expansion stroke, hot expanding gases move from the conical portion of the combustion chamber into the larger diameter motor cylinder. As they do so, the diameter and consequently the angular velocity of the vortex decrease, and the resulting decrease in centrifugal force reduces the tendency of the vortex spin to throw unburned fuel against the cylinder walls. As a result, most of the fuel burns in the central axial portion of the combustion chamber, well away from the cylinder walls.

The hot gases in the core of the vortex are cooled as they expand, and some of these gases are forced outward by the curved face of the piston so that any remaining fuel and an excess of air are drawn into the combustion zone. The remaining fuel, and any partial combustion products resulting from the initial combustion, are then burned at a lower temperature, so that substantially all of the fuel is completely burned before the combustion process ends. During these later stages of the combustion process, the combustion zone may extend radially outward in the combustion chamber.

Thus combustion occurs in a stratified manner, progressing from inner to outer strata of the vortex, so that the initial high-temperature combustion occurs in a central zone initially containing a fuel-rich mixture, and thereafter combustion is completed at lower temperatures with an excess of oxygen that insures complete burning of the fuel. With this improved combustion process, the presence of noxious or irritating combustion products in the exhaust gases is substantially reduced.

As the expansion stroke of the piston continues, cooling of the gases by expansion continues until the exhaust ports are uncovered by the piston, whereupon the hot gases, now having a temperature of only 600 to 800 degrees Fahrenheit, begin to flow into the exhaust manifold. When the inlet ports are uncovered by the piston, a fresh supply of compressed air scavenges and recharges the combustion chamber in a manner hereinbefore explained.

Under most operating conditions, there is a large excess of air and substantially all of the fuel burns in the combustion chamber. During operation at maximum load and during rapid acceleration, some unburned fuel may pass into the manifold connecting the free-piston engine to the turbine, and combustion is completed there in the presence of a large excess of air. To promote such combustion, a catalyzer may, if desired, be placed in the exhaust manifold of the free-piston engine (which is also the intake manifold of the turbine). Thus all of the fuel is always completely burned, and utilized, prior to expansion of the hot gases in the turbine.

The fuel injection system is best shown in Figs. 4 and 9. Fuel pumps and other auxiliaries are mounted in two housings 69 and 70 attached to respective ends of the cylinder structure, and are driven in timed relation to the reciprocating motion of the free-piston structure by a rod 71 that is attached to and reciprocates in unison with the compressor piston.

Rod 71 is parallel to but displaced from the axis of the free-piston structure, and extends through the partially threaded hole 50 in the compressor piston. At the center of rod 71 there is a collar 72 that abuts on a shoulder of hole 50 and is held in place by a hollow nut 73 so that rod 71 is attached to the free-piston structure and reciprocates therewith, but is rotative about its axis. Rod 71 extends through holes provided for this purpose in the compressor valve plates and in portions of the castings 1 and 2 at each end of the compressor cylinder. The ends of rod 71 extend into housings 69 and 70 and have threaded portions 74 and 75, the threaded portion at one end of the rod being provided with left-hand screw threads while the threaded portion at the other end of the rod is provided with right-hand screw threads.

A non-reciprocating spline shaft 76 fits into a hollow grooved end of rod 71 so that rod 71 may reciprocate but may not rotate relative to spline shaft 76. The spline shaft is rotatively mounted in housing 69 by suitable means such as a bearing 77 which is held in place on the spline shaft by a split collar 78. An adjusting knob 79 is fastened to the outer end of spline shaft 76 by any suitable means, such as a pin 80, so that the angular position of rod 71 can be adjusted by rotating knob 79. If desired, a similar spline shaft and adjusting knob 81 may be provided at the other end of rod 71, although one adjusting knob is all that is required.

Within each of the housings 69 and 70 there is a gear 83 in engagement with the threaded portion at that end of rod 71 so that the reciprocating motion of shaft 76 rotates gear 83 in opposite directions alternately. Gear 83 is attached to a cam shaft 84 rotatively mounted in bearings 85 and 86, and drives a pair of cams 87 and 88 in oscillating rotary motion synchronized with the reciprocating motion of the free-piston structure.

Cam 88 operates an oscillatory cam follower 89 that is pivoted on a stationary mounting screw 90. A fuel pump 91 has a reciprocable operating member 92 that rides upon an arcuate surface of cam follower 89 so that member 92 is reciprocated in timed relation to the reciprocating motion of the free-piston structure. At each inward stroke of operating member 92, the fuel pump supplies to the fuel injection nozzle a measured amount of fuel proportional to the length of that stroke. Fuel pump 91 is movable about a stationary mounting screw 93 located substantially at the center of curvature of the arcuate surface of cam follower 89. A link 94 connected to the pump housing is provided for rotating the pump about screw 93 to adjust the position of pump operating member 92 along the length of the arcuate surface of cam follower 89.

There are two identical fuel pumps, one located within housing 69 for supplying fuel to the combustion chamber at the left end of the engine, and one located within housing 70 for supplying fuel to the combustion chamber at the right end of the engine. The two fuel pumps draw fuel from fuel tank 95, and inject fuel into the two combustion chambers alternately through injection nozzles 20 and 21. Fuel injection into each combustion chamber occurs during the compression stroke of the motor piston in that chamber.

The point in the operating cycle at which fuel injection begins can be adjusted by turning either of the adjusting knobs 79 and 81 to adjust the angular position of rod 71. For example, assume that the free-piston structure is stopped at a point in its cycle at which it is desired that fuel injection into the combustion chamber at the right end of the engine should begin. Now when rod 71 is rotated, the gears 83 are rotated and this in turn rotates cams 88. In this way the angular positions of the cams relative to the linear position of the piston structure can be adjusted so that the fuel pump at the right end of the engine is just ready to begin injecting fuel into its combustion chamber. Thereafter, whenever the engine is operated the fuel pump at the right end of the engine always begins injecting fuel into its combustion chamber at the selected point during alternate ones of the operating half cycles, and the other fuel pump begins injecting fuel into its combustion chamber at a corresponding point during the other operating half-cycles.

Because the threaded portion at one end of rod 71 has right-hand screw threads, while that at the other end of rod 71 has left-hand screw threads, the cyclic starting times of both fuel pumps are adjusted by equal amounts and in the same sense whenever the angular position of rod 71 is re-adjusted by turning either of the adjusting knobs 79 and 81.

During the compression stroke of the piston in a combustion chamber, cam 88 of the fuel pump supplying that combustion chamber rotates in a direction to move the operating member 92 inward with respect to the fuel pump housing, thereby pumping fuel through the injection nozzle of that combustion chamber. At the end of the compression stroke, the motion of the free-piston structure reverses and at the same time the motion of cams 88 reverses, so that the injection of fuel stops substantially at the end of each compression stroke. Consequently, the amount of fuel injected into a combustion chamber during each compression stroke of its piston is a measured amount proportioned as a direct function of the length of that compression stroke.

Whenever the reciprocating motion of the free-piston structure increases in amplitude, the oscillating rotary motion of cams 88 also increases in amplitude so that more fuel per cycle is injected into each combustion chamber. Conversely, when the reciprocating motion decreases in amplitude, less fuel per cycle is injected into each combustion chamber. Preferably, cams 88 are shaped so that the amount of fuel injected during each compression stroke is linearly proportional to the length of that portion of the compression stroke that occurs after fuel injection begins. Significant advantages of this arrangement are discussed in more detail elsewhere in this specification.

The amount of fuel injected per cycle can also be controlled by adjusting link 94 to rotate the fuel pump about its mounting screw 93. The oscillating rotation of cam 88 causes cam follower 89 to oscillate about its pivot 99. When pump 91 is rotated about its pivot 93 in a direction that moves the pump operating member 92 along the arcuate surface of cam follower 89 to a position nearer pivot 90, the amplitude of the reciprocating motion of pump operating member 92 is reduced and a smaller amount of fuel per cycle is injected into the combustion chamber. Conversely, when pump 91 is rotated in the other direction about its pivot 93, the amplitude of the reciprocating motion of pump operating member 92 increases, and consequently an increased amount of fuel per cycle is injected into the combustion chamber. This adjustment permits the use of a variety of fuels, and also permits accurate matching of operating characteristics between the hot gas producer and the turbine.

At times, during the starting of the engine for example, it may be desirable to operate the fuel pumps while the free-piston structure is stationary. For this purpose, there may be provided a pin 96 that extends through the housing of the auxiliaries, as is shown in Fig. 1, and that can be depressed against the bias of a spring 97 until the inner end of pin 96 presses against the free end of cam follower 89 and depresses the pump operating member 92.

In addition to the two fuel pumps, the auxiliary apparatus contained in housings 69 and 70 includes a plurality of electric switches, best shown in Figs. 9, 10, and 11. Although the fuel pumps contained in the two housings are identical, the electrical switches are somewhat different. Within the housing 69 at the left end of the engine, a cam 87 which operates the ignition circuit breakers is attached to the cam shaft 84. Within the housing 70 at the right end of the engine, a somewhat different cam 87' is attached to the cam shaft 84.

Cam 87' operates two electric switches, best shown in Fig. 10, which are parts of the starting system hereinafter described. Referring now to Fig. 10, the two switches 98 and 99 have movable contacts attached to cam followers 100 and 101, respectively, and have fixed contacts attached to a disc 102 that is fastened to a housing part 103 by suitable means such as screws 104.

When the free-piston structure is substantially at its mean position relative to its reciprocating motion, that is, when the free-piston structure is substantially centered relative to the cylinder structure, both of the switches 98 and 99 are closed, as illustrated in Fig. 10. When the free-piston structure is moved in either direction away from its mean position, cam 87' is rotated in one direction or the other, and one or the other of the switches 98 and 99 is opened, depending on the direction in which the free-piston structure is displaced from its mean position. When the piston structure moves toward the left end of the engine, switch 99 is opened while switch 98 remains closed, and when the piston structure moves toward the right end of the engine, switch 98 is opened while switch 99 remains closed.

Now referring in particular to Fig. 11, two electric switches 105 and 106 are normally-closed circuit breakers for the ignition system of the engine. Circuit breaker 105 has a movable contact attached to a cam follower 107 that is mounted on a disc 108, and has a fixed contact that is attached directly to disc 108. Circuit breaker 106 has a movable contact attached to a cam follower 109 that is mounted on a disc segment 110, and has a stationary contact that is mounted directly on disc segment 110. Capacitors 111 and 112 may be mounted on the back side of disc 108, as shown in Fig. 9. As the free-piston structure reciprocates, cam 87 is rotated, first in one direction and then in the other, by the mechanical linkage hereinbefore described.

During a major portion of each cycle of the oscillating rotary motion of cam 87, both of the circuit breakers 105 and 106 are closed. Toward the end of its rotary motion in one direction, cam 87 operates cam follower 107 to open circuit breaker 105 momentarily, and toward the end of its rotary motion in the other direction cam 87 operates cam follower 109 to open circuit breaker 106 momentarily. Since cam 87 is driven by the reciprocating motion of the free-piston structure through a mechanical linkage hereinbefore described, the amplitude of the oscillatory rotary motion of cam 87 is directly proportional to the amplitude of the reciprocating motion of the free-piston structure.

In a manner hereinafter more fully explained, circuit breakers 105 and 106 control the timing of electric sparks that ignite the explosive mixtures in the two combustion chambers alternately for reversing the direction of motion of the free-piston structure. Consequently, the amplitude of the reciprocating motion of the piston structure is controlled by the timing of the sparks relative to the instantaneous position of the piston structure, which in turn depends upon the angular positions of cam followers 107 and 109 relative to the mean position of cam 87.

These angular positions can be adjusted in the following manner: Disc 108 and disc segment 110 are each rotative about the axis of cam shaft 84, and for the purpose of rotating these two parts each has a sector containing gear teeth, as shown in Fig. 11. Two gears 113 and 114 are in engagement with respective ones of these sectors and with each other. Gear 113 is attached to a shaft 115 that extends through housing part 116, as is best shown in Fig. 9, and which has an adjusting knob 117 attached to its outer end. When knob 117 is turned, gear 113 rotates disc 108 in one direction, while gear 114 rotates disc segment 110 in the opposite direction. This increases or decreases the angular spacing of cam followers 107 and 109, depending upon the direction in which knob 117 is turned, and thus advances or retards the timing of the electric sparks supplied to the combustion chambers.

When cam followers 107 and 109 are moved closer to the mean angular position of cam 87, the electric sparks supplied to both combustion chambers are advanced in their timing relative to the reciprocating motion of the free-piston structure, and the amplitude of such reciprocating motion is thereby reduced. Conversely, when cam followers 107 and 109 are moved farther from the mean angular position of cam 87, the sparks supplied to both combustion chambers are retarded and the amplitude of the reciprocating motion is increased. In other words, circuit breaker 105 is opened whenever the free-piston structure moves an adjustable distance in one direction from the mean or center position of its reciprocating motion, while circuit breaker 106 is opened whenever the piston structure moves an adjustable distance in the other direction from its mean position, and the magnitudes of both of these adjustable distances can be varied simultaneously by equal amounts and in the same sense by turning a single adjustment 117. This adjustment can be made while the engine is operating, and provides a convenient means for varying the output power. In place of knob 117, any desired adjusting mechanism may be employed to turn shaft 115.

The electrical circuit diagram of the engine is shown in Fig. 12. A battery 118, or other voltage source, supplies electric power through an ignition switch 119 to the low-voltage windings or primaries of induction coils 120 and 121. The low-voltage winding of induction coil 120 is returned to ground through circuit breaker 106, and the low-voltage winding of induction coil 121 is returned to ground through circuit breaker 105. Capacitors 111 and 112 are connected in parallel with the two circuit breakers in a conventional manner. The high-voltage winding or secondary of induction coil 120 is connected to spark plug 22, and the high-voltage winding or secondary of induction coil 121 is connected to spark plug 23.

As the free-piston structure reciprocates, circuit breakers 105 and 106 are opened alternately in timed relation to the motion of the piston structure, as hereinbefore explained. As each circuit breaker opens, it interrupts the electric current through the low-voltage winding of the induction coil to which it is connected, and the induction coil supplies a high-voltage electric impulse to the spark plug connected to its high-voltage winding, so that an electric spark is produced across the spark gap of the spark plug. In this way electric sparks are produced by spark plugs 22 and 23 alternately in timed relation to the reciprocating motion of the free-piston structure.

For starting the engine in a manner hereinafter described, a two-position break-before-make switch 122 may be connected in series with the low-voltage winding of induction coil 121, as shown. A capacitor 123 is connected in parallel with switch 122. It will be noted that the electric circuit through switch 122 is closed when the switch is in either of its two positions, but since switch 122 is of the break-before-make type, this circuit is momentarily opened each time that switch 122 is operated. Consequently, each operation of switch 122 interrupts the electric current through the primary of induction coil 121, and thereby produces an electric spark across the spark gap of spark plug 23.

Two electrically controlled valves 124 and 125 may be conventional solenoid-operated valves that are normally closed, but are opened when electric current is supplied to the windings of their solenoids, 124' and 125' respectively. The solenoids are connected to battery 113 through ignition switch 119 and a starting switch 126, and are returned to ground through switches 98 and 99.

Referring to Fig. 4, the starting apparatus includes a source of compressed gas, which may be a tank 127 containing compressed air, or may be an auxiliary air compressor or any other source of compressed gas. Tank 127 is connected to the combustion chamber at the left end of the engine through valve 124 and check valve 24, and is connected to the combustion chamber at the right end of the engine through valve 125 and check valve 25.

The engine is so constructed that the stroke length or amplitude of the reciprocating motion of the free-piston structure is variable. The stroke length is minimum when the amplitude of motion is such that the motor pistons just begin to uncover the inlet ports at the end of each expansion stroke. The stroke length is maximum when the amplitude of motion is such that the motor pistons just clear the cylinder heads at the end of each compression stroke, and fully uncover the inlet and exhaust ports at the end of each expansion stroke. For example, the engine may be so designed that the minimum amplitude of the reciprocating motion is about two inches, while the maximum amplitude of such motion is about three inches. Then the maximum amplitude of the reciprocating motion is about 50 percent greater than the minimum amplitude of such motion.

The length of each compression stroke, and therefore the amplitude of the reciprocating motion, is controlled by the timing of the ignition spark relative to the reciprocating motion of the free-piston structure. As hereinbefore explained, the spark can be advanced or retarded, selectively, by turning adjusting knob 117 of the ignition circuit-breaker apparatus. A small change in the stroke length produces a much larger change in the output power of the engine, as will now be explained.

The output power of the engine is a function of both the pressure and the flow rate of gas in the exhaust manifold. The pressure in the exhaust manifold is generally determined by the back pressure of the turbine or other utilization device to which the gas is supplied. Since the back pressure of such device is often a direct function of the flow rate, for present purposes the output power of the engine can be considered a direct non-linear function of the mass flow rate of gas through the exhaust manifold. The difference between the mass flow rate of the exhaust gases and the mass flow rate of air through the air compressor is substantially less than 10 percent (such difference being equal to the mass rate of fuel injection). Consequently, the output power can be considered a direct non-linear function of the mass flow rate of air through the air compressor.

As the stroke length of the free-piston structure increases, the amount of air compressed per stroke of the air compressor also increases, thereby increasing the output work per stroke of the engine. An increase in stroke length also increases the maximum pressures in the combustion chambers by a factor greater than the fractional increase in the stroke length, thereby increasing the "spring constant" of the reciprocating mass and increasing the cyclic rate of operation of the engine. Both of these increases increase the flow rate of the exhaust gases, thereby increasing the back pressure in the exhaust manifold and further increasing the work done per stroke. Therefore an increase in the stroke length produces increases in both the amount of work done per stroke and the number of strokes per unit of time, so that a small fractional increase in the stroke length causes a much larger fractional increase in the power output. In a typical engine of the type herein described, a 50 percent increase in stroke length may produce a sixteen fold increase in output power. Likewise a sixteen fold power increase produces nearly twice the speed of acceleration.

The power output of the engine can be varied in ways other than by varying the timing of the sparks, although the spark-timing-adjustment method is preferred. For example, the cyclic rate of operation, and therefore the power output, can be varied by varying the amount or timing or both of fuel injected into the combustion chambers, by adjusting links 94 of the fuel pumps for example, without advancing or retarding the spark. However, for reasons discussed elsewhere in this specification, the preferred method of operation is to control the power output by advancing and retarding the spark, while the amounts of fuel injected into the combustion chambers are controlled automatically in the manner herein described. Still another method of controlling the power output would be to throttle the inlet or exhaust gases. This also is undesirable, since considerable energy would be lost in the throttling process, with a consequent decrease in overall efficiency.

Since the amount of air compressed per cycle is a direct function of the stroke length, the amount of fuel injected per cycle should also be a direct function of the stroke length. The fuel injection system of the engine herein described automatically regulates the supply of fuel in a most advantageous manner, since the amount of fuel injected into the combustion chambers during each compression stroke is measured and proportioned as a direct function of the length of that stroke. Consequently, any variation either in the stroke length or in the cyclic rate of operation results in an immediate and automatic adjustment of the fuel injection rate to supply the correct amounts of fuel to each combustion chamber during each compression stroke of the motor piston in that chamber. Therefore, the preferred method for varying the output power is to control the stroke length by adjustment of the ignition timing, rather than by direct adjustment of the fuel injection rate.

As hereinbefore explained, the fuel pumps 91 are operated in timed relation to the reciprocating motion of the free piston structure by cams 88. Whenever the free piston-structure changes its direction of motion, the cams 88 also change their directions of motion, so that fuel injection always stops substantially at the end of the compression stroke and is never carried over into the expansion stroke.

The point at which fuel injection begins during each compression stroke can be adjusted by rotating either of the adjusting knobs 79 and 81 to adjust the angular position of cams 88 relative to the linear position of the free-piston structure. Furthermore, the amount of fuel injected per stroke can also be adjusted by means of linkages 94 which control the points of contact of the pump operating members 92 with the arcuate surfaces of cam followers 89, whereby the richness of the mixture of air and fuel within the combustion chambers can be adjusted. By means of these adjustments, which can be made at any time without interrupting the operation of the engine, the amount of fuel injected into each combustion chamber can be made substantially optimum for all normal operating conditions.

In any internal combustion engine, an occasional misfire is to be expected. In general, prior free-piston engines have had the disadvantage that a single misfire would always cause the engine to stall. With the improved engine herein described, nonconsecutive misfires usually do not cause stalling of the engine.

For a better understanding of this feature, consider that the free-piston structure is moving toward the right and is compressing a mixture of air and fuel within the combustion chamber at the right end of the engine. The inlet and exhaust ports of this combustion chamber are covered by the piston, and the gases within the combustion chamber are ultimately compressed to a high pressure, 10 or more atmospheres, for example. At the same time the piston of the compression chamber at the left end of the engine is making an expansion stroke, at the end of which the exhaust ports of this combustion chamber are uncovered by its piston so that the pressure within the combustion chamber at the left end of the engine drops substantially to the back pressure in the exhaust manifold, which is generally about three or four atmospheres. Consequently, even though a misfire occurs and the explosive mixture within the combustion chamber at the right end of the engine is not ignited, there is a large pressure difference between the two combustion chambers at opposite ends of the free-piston structure, and this pressure difference causes the free-piston structure to "bounce" and move toward the left with sufficient velocity to compress a mixture of air and fuel in the combustion chamber at the left end of the engine.

After a misfire, the free-piston structure usually will "bounce" a sufficient distance to open the ignition circuit breaker that produces electric sparks in the combustion chamber at the opposite end of the engine, and thereafter operation may proceed in a normal manner. Consequently, a single misfire, or a plurality of non-consecutive misfires, will seldom cause the engine to stall.

Preferred means for starting the engine include the check valves 24 and 25, the electrical switches 98 and 99, the electrically controlled valves 124 and 125, and the compressed air supply 127. Referring particularly to Figs. 4, 10 and 12, the first step in starting the engine is to close the ignition switch 119 and the starting switch 126.

If the free-piston structure is not initially in its mean position, that is, if it is not centered in the cylinder structure, one of the switches 98 and 99 will be initially open while the other one of these switches will be initially closed. Assume, for example, that the free-piston structure is initially displaced from its mean position toward the left end of the engine, as shown in Fig. 4. Under these conditions, switch 99 is open while switch 98 is closed. Consequently, there is a closed electric circuit through the solenoid 124' of valve 124, which opens valve 124 while valve 125 remains closed. Therefore, compressed air flows from supply 127 through valves 124 and 24 into the combustion chamber at the left end of the engine, and this compressed air moves the free-piston structure toward the right.

When the free-piston structure reaches its mean position, or is centered in the cylinder structure, both of the switches 98 and 99 are closed and both of the valves 124 and 125 are opened. Now compressed air flows through valves 125 and 25 into the combustion chamber at the right end of the engine, and both combustion chambers are charged with compressed air at substantially the same pressure. Consequently, there is no force tending to move the free-piston structure in either direction, and it remains substantially in its mean position.

The next step in starting the engine is to inject fuel into the combustion chambers. This may be done by depressing pins 96 (see Figs. 1 and 9) one or more times to operate the two fuel pumps. Although injection of fuel into only one combustion chamber is required, preferably fuel is injected into both combustion chambers to insure an adequate supply of fuel during the first operating cycle of the engine.

The next step in starting the engine is to provide an electric spark in one of the combustion chambers to ignite the mixture of fuel and air therein. This may be done by operating the switch 122, which momentarily breaks the electric circuit through the primary of induction coil 121 and thus provides an electric spark across the spark gap of spark plug 23. The electric spark ignites the mixture of air and fuel in the combustion chamber at the right end of the engine, and the resulting explosion drives the free-piston structure toward the left.

As soon as the free-piston structure has moved toward the left a sufficient distance to open the ignition circuit breaker 106, an electric spark is produced across the spark gap of spark plug 22, which ignites the explosive mixture in the combustion chamber at the left end of the engine. The engine now continues to operate in a normal manner, since the reciprocating motion of the free-piston structure operates the fuel pumps and the ignition circuit breakers to produce explosions in the two combustion chambers alternately which sustain the reciprocating motion of the piston structure.

Check valves 24 and 25 each close as soon as an explosion in its combustion chamber raises the pressure therein above the pressure supplied by compressed air source 127, so that a backward flow of gases from the combustion chambers through the starting system is prevented. However, during the first few compression strokes of each piston, until the air compressor has built up sufficient pressure in the air receiver to scavenge and recharge the combustion chambers, additional amounts of compressed air may flow into the combustion chambers through check valves 24 and 25 to insure adequate recharging of the combustion chambers.

As soon as the engine is in normal operation, starting switch 126 may be opened to break the electric circuits through solenoids 124' and 125', and valves 124 and 125 then remain closed until the next occasion when starting of the engine is desired.

Various modifications may be made in the starting apparatus and method. For example, separate fuel pumps and a separate ignition system may be provided for use only during starting operations. Instead of injecting fuel directly into the combustion chambers as a step in the starting process, source 127 may supply a mixture of air and fuel for providing the initial explosive charges in the two combustion chambers. Furthermore, valves may be provided for permitting the escape of gases from one combustion chamber while compressed air is being supplied to the other combustion chamber during the first step of the starting operation, and if desired means may be provided for momentarily venting both combustion chambers to the atmosphere to permit the compressed air to scavenge therefrom any undesired gases or mixtures that might be present.

Since most of the energy provided by combustion of the fuel is used to compress air, the amount of air compressed is considerably in excess of the amount of air required to scavenge and charge the combustion chambers. In the embodiment hereinbefore described, the excess air simply passes through the combustion chambers into the exhaust manifold 19 during intervals when inlet ports 15 and exhaust ports 16 are both uncovered. Because of the large area of these ports, the resistance to such air flow is small, and losses due to passing all of the air through the combustion chambers are not excessive. However, it may be desirable in some engines to by-pass some of the air around the combustion chambers. A preferred means for doing this is incorporated in the alternative embodiment illustrated schematically in Figs. 13 and 14.

Referring now to Figs. 13 and 14 of the drawings, a free-piston engine, generally similar to the engine hereinbefore described, comprises a cylinder structure 128 and a reciprocable hollow piston structure 129. The heavy broken arrows indicate the instantaneous direction of piston motion. The center portion of the engine is a double-acting air compressor that provides a supply of compressed air within the hollow piston structure, which acts as an air receiver. Fuel is burned alternately in two combustion chambers 130 and 131, located at opposite ends of the engine, for driving the piston structure back and forth in reciprocating motion. The combustion chambers are scavenged and recharged, in the manner hereinbefore explained, by air flowing from the piston structure through ports 132 and 133 and air passages 134 and 135. Hot gases are delivered from the combustion chambers through exhaust ports 136 and 137 to exhaust manifold 138.

For by-passing a portion of the air flow around the combustion chambers, additional ports 139 and 140 are provided in the sides of the motor pistons, as shown. During operation of the engine, some of the air compressed by the air compressor passes through the combustion chambers for scavenging and recharging the combustion chambers at the end of each expansion stroke. Some, or even most, of the compressed air passes through ports 139 and 140 and is spilled directly into the exhaust manifold without passing through the combustion chambers. The spilled air and the gases exhausted from the combustion chambers both enter exhaust manifold 138, mix together, and are conveyed to the turbine. If the gases exhausted from the combustion chambers contain unburned or partially-burned fuel, combustion is completed in the exhaust manifold in the presence of a large excess of air.

Assume that the piston structure is in a left-of-center position, as shown in Fig. 13, such that the inlet and exhaust ports of combustion chamber 131 are uncovered. Air flows from the air receiver (the inside of hollow piston structure 129) through port 133, passage 135, combustion chamber 131 and exhaust port 137 into exhaust manifold 138. This air flow scavenges and recharges combustion chamber 131, and reduces the air receiver pressure to substantial equality with the exhaust manifold pressure, which depends upon the back pressure of the turbine and may, for example, be about 3 or more atmospheres. The explosive mixture in combustion chamber 130 is ignited, and the piston structure is driven toward the right. As the piston structure moves toward the right, the ports of combustion chamber 131 are covered and the air compressor begins to pump more air into the air receiver. Consequently, the pressure in the air receiver rises. As motion of the piston structure continues, ports 139 and 140 come into alinement with exhaust ports 136 and 137, respectively, not necessarily at the same time, and air is spilled from the air receiver directly into the exhaust manifold. The air receiver pressure is again reduced to substantial equality with the exhaust manifold pressure. As the piston structure continues to move toward the right, ports 139 and 140 move past and beyond the exhaust ports and the spilling of air into the exhaust manifold substantially stops. Since the compressor is still supplying air to the air receiver, the air pressure inside piston structure 129 rises again. Toward the end of the left-to-right motion of the piston structure, the inlet and exhaust ports of combustion chamber 130 are uncovered, and air flows through combustion chamber 130 to scavenge and recharge this combustion chamber. When the explosive charge in combustion chamber 131 is exploded, the piston structure is driven toward the left and a similar sequence of events occurs as the piston structure moves from right to left. The ratio between the amount of air passing through the combustion chambers and the amount of air spilled directly into the exhaust manifold depends upon the size and location of ports 139 and 140.

The pressure in the exhaust manifold depends upon the back pressure of the turbine, and, at a given flow rate, is the same whether all the air passes through the combustion chambers or part of the air is spilled directly into the exhaust manifold. The temperature of the mixed gases in the exhaust manifold depends upon the amount of fuel burned and the total air flow. Consequently, the power output and efficiency of the engine are essentially the same whether all of the air flows through the combustion chambers or part of the air is by-passed around the combustion chambers.

From the above description it will be seen that while it is desirable to burn all of the fuel in the motor cylinders any malfunction of fuel injection or distribution of a charge of fuel or an excess of fuel for the air entrapped in the motor cylinder does not cause the discharge of noxious gases from the turbine.

Any excess of fuel over that needed for combination is simply added to the large (fourfold) excess of air in the exhaust (turbine inlet) manifold where combustion is completed before the gases reach the turbine.

When installed in an automobile where high accelerations are demanded as much as 25% of the fuel may pass into the turbine inlet manifold where it will all burn, at lower efficiency it is true, but with non-toxic exhaust.

While a conventional diesel engine burns substantially all the fuel but no more than 80% of the air, a conventional gasoline engine burns all the air but only 75–80% of the fuel. Thus the gasoline engine has a power output 25–40% greater than that of a diesel engine of the same size. The free-piston engine herein described can deliver the higher power of the gasoline engine with the cleaner exhaust of the well-adjusted diesel, and thereby combines advantages of conventional gasoline and diesel engines, and also provides other advantages not obtainable with either type of conventional engine.

It should be understood that this invention in its broader aspects is not limited to specific embodiments herein illustrated and described, and that the following claims are intended to cover all changes and modifications that do not depart from the true spirit and scope of the invention.

What is claimed is:

1. In a hot gas producer, a unitary free-piston structure comprising a hollow compressor piston between and axially alined with two motor pistons, said compressor piston being open at both ends and of larger diameter than said motor piston, forming an annular opening at each end of the hollow compressor piston between the compressor piston and the adjacent motor piston, and a plurality of internal ribs extending lengthwise in said structure and rigidly connecting said compressor piston to said motor pistons.

2. In a hot gas producer, a unitary free-piston structure comprising a hollow compressor piston between and axially alined with two hollow motor pistons, a plurality of internal ribs extending lengthwise in said structure and rigidly connecting said compressor piston to said motor pistons, said compressor piston being of larger diameter than said motor pistons and being open at both ends, forming an annular opening at each end of the compressor piston between the compressor piston and the adjacent motor piston, two perforated truncated conical valve plates covering the open ends of said compressor piston, and a plurality of movable valve leaves mounted upon said plates over the perforations therein forming check valves permitting unidirectional air flow into said hollow compressor piston.

3. In a hot gas producer, a hollow free-piston structure comprising an open-ended hollow compressor piston fixedly attached to and axially alined with a motor piston of smaller diameter so that an annular opening exists between said two pistons, a perforated annular plate fixedly attached to said pistons and covering said opening, and a plurality of elongated leaves radially oriented and resiliently mounted upon the inner surface of said plate, said leaves being spring-biased toward said plate to cover the perforations therein, thereby forming check valves permitting unidirectional air flow into said hollow compressor piston.

References Cited in the file of this patent

UNITED STATES PATENTS

| | | |
|---|---|---|
| 1,121,584 | Harper | Dec. 15, 1914 |
| 1,218,132 | Tuhey | Mar. 6, 1917 |
| 1,356,757 | Edgar | Oct. 26, 1920 |
| 1,383,536 | Davis | July 5, 1921 |
| 1,463,973 | Rice | Aug. 7, 1923 |
| 1,613,145 | Trump | Jan. 4, 1927 |
| 1,614,124 | Hansen | Jan. 11, 1927 |
| 1,682,130 | Johnston | Aug. 28, 1928 |
| 1,904,854 | Clark et al. | Apr. 18, 1933 |
| 1,928,018 | Heinzelmann | Sept. 26, 1933 |
| 1,955,007 | McClay | Apr. 17, 1934 |
| 2,034,093 | Gehrandt | Mar. 17, 1936 |
| 2,273,095 | Fitch | Feb. 17, 1942 |
| 2,410,428 | Cronstedt et al. | Nov. 5, 1946 |
| 2,423,720 | Mullejans et al. | July 8, 1947 |
| 2,426,310 | Kalitinsky et al. | Aug. 26, 1947 |
| 2,426,613 | Jackson | Sept. 2, 1947 |
| 2,466,255 | Mercier et al. | Apr. 5, 1949 |
| 2,503,152 | Ekblom | Apr. 4, 1950 |
| 2,526,384 | Mercier | Oct. 17, 1950 |
| 2,669,979 | Kiekhaefer | Feb. 23, 1954 |
| 2,676,578 | Ramsey et al. | Apr. 27, 1954 |
| 2,689,552 | Kiekhaefer | Sept. 21, 1954 |

FOREIGN PATENTS

| | | |
|---|---|---|
| 26,783 | Great Britain | Nov. 18, 1909 |
| 4,443 | Great Britain | Feb. 22, 1912 |
| 803,388 | Germany | Apr. 2, 1951 |